Aug. 7, 1934.    L. KIRSCHBRAUN    1,969,308
MANUFACTURE OF AQUEOUS DISPERSIONS
Filed Nov. 13, 1930
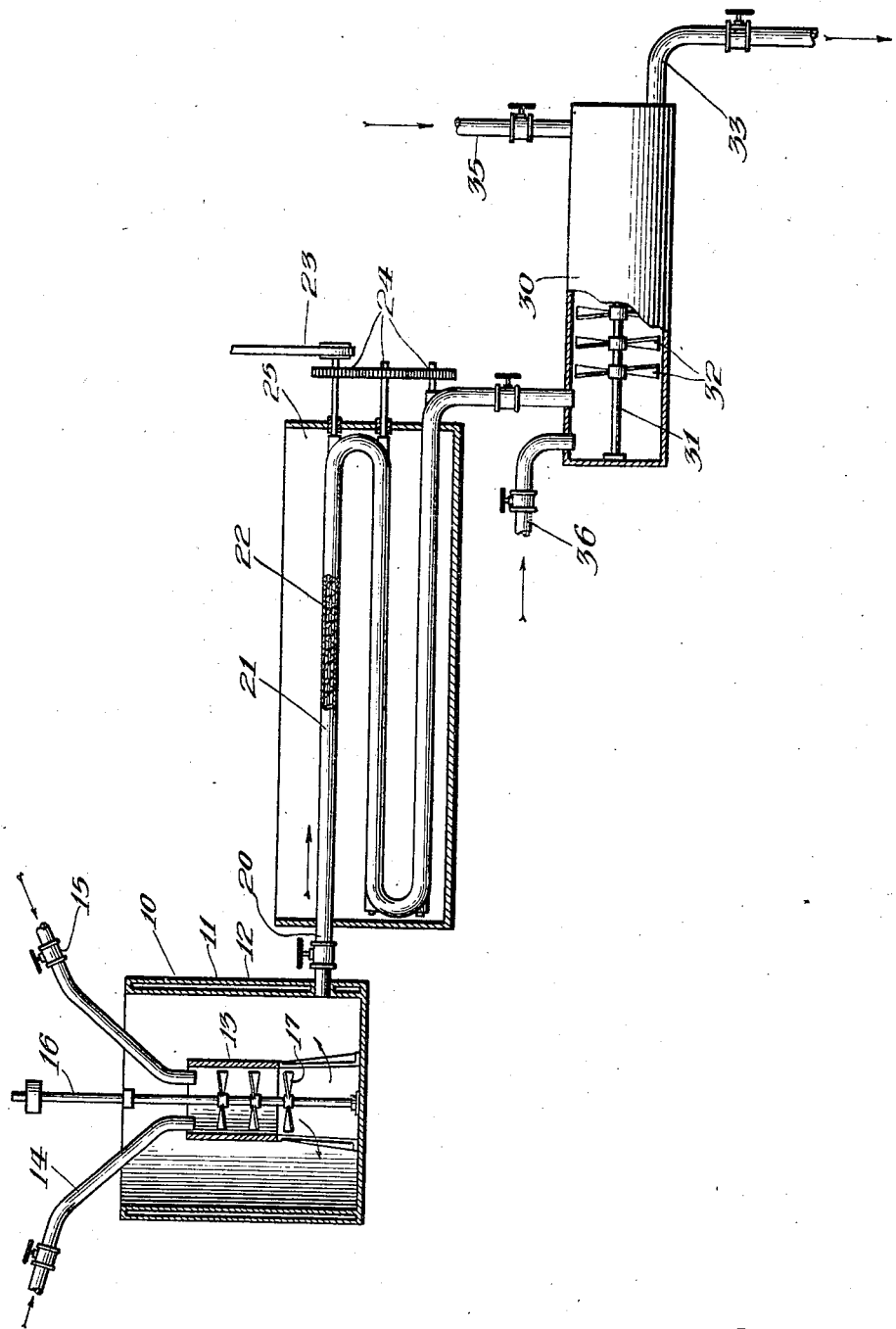
Witness:
Inventor:
By Lester Kirschbraun
Frank L. Belknap
Atty:

Patented Aug. 7, 1934

1,969,308

UNITED STATES PATENT OFFICE 1,969,308

MANUFACTURE OF AQUEOUS DISPERSIONS

Lester Kirschbraun, Leonia, N. J., assignor, by mesne assignments, to The Patent and Licensing Corporation, New York, N. Y., a corporation of Massachusetts Application November 13, 1930, Serial No. 495,471

6 Claims. (Cl. 134—1)

This invention relates to improvements in the art of manufacturing aqueous dispersions and has particular relation to improvements in the art of manufacturing aqueous dispersions of bituminous substances of a more or less non-fluid nature with the aid of mineral powder or paste-forming colloids.

The manufacture of aqueous dispersions of this type by a dispersing action in which the bitumen is conditioned for attenuation and then subjected to the action of agitating blades capable of causing attenuation and rapid sub-division of the bitumen through interfacial trituration is well known.

In the commercial manufacture of bituminous dispersions by this process, it is essential that the temperature of the material undergoing emulsification be carefully regulated within fairly narrow limits and, depending upon the melting point and hardness of the material being emulsified, there is generally a lower limit below which the bitumen will have a viscosity too high to permit the efficient attenuation and subdivision thereof into fine particles and, likewise, there is an upper temperature limit above which there might be danger of local coalescence of dispersed particles occurring in the bath of material undergoing dispersion.

In commercial practice the product as withdrawn from the dispersing apparatus is of a more or less pasty character which renders it necessary to dilute the material with water in order to bring it to a consistency suitable for certain uses such, for example, as for spraying the material or for brushing it with an ordinary paint brush. I have heretofore discovered that, if the thick pasty product as it issues from the dispersing apparatus is subjected to a rapid beating or whipping action, the viscosity thereof can thereby be materially reduced and hence, depending upon the consistency desired such a beating or whipping action may be employed to impart the desired consistency to the product without requiring the use of dilution water, or at least without requiring that amount of dilution water which would normally be necessary to bring about the desired thinning in the absence of the beating or whipping treatment. This type of operation is set forth in my previous Patent No. 1,616,904, dated February 8, 1927.

My present invention relates to improvements in the afore-described methods of manufacturing aqueous dispersions. In accordance with the present invention I have found that if the thick pasty product as it issues from the dispersing apparatus is first subjected to a cooling action, whereby substantially to reduce its temperature, the beating or whipping action is thereby facilitated and the final characteristics of the product likewise improved.

The present invention is adaptable for the treatment of dispersions of bituminous substances of varying melting points and hardness, and in the accompanying drawing there is shown more or less diagrammatically, an apparatus that may be employed in carrying out the invention.

In the drawing the numeral 10 indicates an emulsifying or dispersing apparatus which may comprise a cylindrical tank 11 with jacketed walls 12 and having mounted centrally therein an open ended conduit or circular baffle 13. The material to be emulsified may be conducted into the emulsifying apparatus as through a valved feed pipe 14 and the emulsifying agent may be fed as through a valved feed pipe 15 preferably in the form of an aqueous suspension of mineral colloid of the group which produces a viscous plastic mixture with water such as bentonite, clay, fuller's earth, mineral pigments, slate dust, ochre, sienna, metallic oxides and hydroxides and silicates.

Both of these pipes preferably are so arranged as to feed the material into the upper open end of the conduit 13. A shaft 16 carrying propellers or agitating blades 17 is mounted centrally within the conduit 13, the blades being so pitched as to induce and promote attenuation of the bitumen and cause circulation thereof downwardly through the conduit 13 and upwardly in the annular space between the conduit and the walls of the tank 11. The shaft 16 may be driven at any appropriate speed from a suitable source of power (not shown).

An opening near the lower end of the tank 11 is connected with the discharge pipe 20 and this pipe is adapted to feed the material from the dispersing apparatus 10 through a cooling zone for the purpose of which I may employ a relatively long conduit 21 provided with screw conveyors 22 to feed that material therethrough continuously and regularly, the screw conveyors being operated from any suitable source of power (not shown) through a driving belt 23 and gears 24. The pipe 21 in actual practice may be from 50 to 75 feet long and from 6 to 10 inches in diameter and is maintained in heat exchange relationship with cooling water or other cooling medium, circulated either through jackets (not shown) formed with the pipe 21, or through a tank 25 as shown. The outlet of the pipe or conveyor 21 leads into the apparatus conventionally indicated at 30 comprising a beating or whipping machine which may comprise a horizontally elongated tank provided with a pair of parallel rotating shafts 31, having mounted thereon blades or paddles 32. This apparatus may resemble or consist of a double pug mill beater of a construction satisfactory for the purpose. The finished product may be withdrawn from the beater 30 as by means of a pipe 33.

In utilizing the apparatus above described to carry out one adaptation of my invention, asphalt of the required melting point may be fed to the emulsifier 10 simultaneously with the feeding thereto of an aqueous suspension of bentonite or other emulsifying agent. It will be understood that the bath of material constantly maintained in the emulsifier 10 during the operation will be of a thick pasty consistency in order to provide the necessary internal friction. Under the action of the agitating blades the asphalt will become dispersed into finely divided particles. The asphalt will be fed to the emulsifying apparatus at a suitably controlled temperature, depending upon its melting point, and, likewise, the temperature of the bath of the material in the emulsifier will be maintained at a regulated temperature by circulation of a cooling medium through the jacketed wall 12 thereof. Thus, for example, where asphalt of about 110° F. melting point is to be dispersed, it may be fed to the emulsifying apparatus at a temperature of approximately 160° F. and the material in the bath maintained at a temperature approximating the melting point of the asphalt.

Similarly, where the asphalt being emulsified has a melting point of, say 135° F., it may be fed through the pipe 14 at a controlled temperature approximating 200° F. and the material in the bath likewise may be maintained at a temperature approximating the melting point of the asphalt. In any event the emulsified material may be withdrawn continuously from the emulsifier through the pipe 20 and conducted through the cooling conveyor or pipe 21 before it is subjected to the beating or whipping action in the beating machine 30.

In one practical embodiment of the invention, the reduction in the temperature of the material by passage thereof through the cooling conveyor 21 should preferably approximate 10 to 20° F. Thus, in the case of asphalt having a melting point of 110° F. and issuing at approximately that temperature from the emulsifier 10, the action of the cooling medium in heat exchange relationship with the pipe 21 should be such as to abstract sufficient heat from the material to lower the temperature thereof to about 90 to 100° F. On the other hand, if the dispersed asphalt has a melting point of 135° F. the material issuing from the emulsifier 10 will be approximately at that temperature and the cooling action of the material in its passage through the pipe 21 should be sufficient to reduce the temperature of the material to, say 115 to 122° F. When the temperature of the material is thus reduced to a substantial degree and fed to the beating or whipping apparatus 30, the beating or whipping action is facilitated and hastens the thinning action or reduction in viscosity to a marked degree. The beneficial effect of reduction of temperature as herein set forth is not limited to the figures specified, but is generally proportionate to the actual degree of cooling effect upon the dispersion prior to the beating action.

In the commercial manufacture of bituminous dispersions it is frequently necessary to combine with the dispersion certain specific agents in order to impart to the dispersion certain well defined properties which render them suitable for specific uses. Thus, for example, in certain cases the dispersion is combined with fibrous material, while in other instances certain organic or inorganic compounds are added to the dispersion to impart rust inhibitive properties thereto; in other cases it is desired that the finished material contain certain organic or inorganic compounds or electrolytes in order to bring about certain bodying effects.

According to another phase of the invention I find that by cooling the dispersion before the beating action the incorporation therein of material of the aforementioned types is facilitated, and any tendency of the material to cause flocculation of the dispersion is eliminated. In adapting the invention to a procedure of this type the desired compounding ingredients may be fed to the dispersion contained in the beating or whipping apparatus 30 as by means of valved pipes 35 and 36. In practice, it may be found desirable to first subject the cooled dispersion to the action of the beater 30 in order to bring about a desired degree of liquefaction or reduction in viscosity thereof, whereupon the desired compounding ingredients may be fed thereto and the action of the beater continued.

Another aspect of the invention in accordance with which I have found that the cooling action of the dispersion affords marked advantages in commercial practice, resides in the ease with which this cooling action enables the beating apparatus 30 to function as an emulsifier and causing further subdivision of the particles of the dispersion. For certain uses it is required that the dispersed particles be of a much smaller size than can be attained in the emulsifier 10, and I have found that if the dispersion product as it issues from the emulsifier is caused to be thickened by suitable agents for the purpose, the dispersed particles may be brought to the desired state of fineness by virtue of the increased internal viscosity of the thickened mass and the agitating action in the apparatus 30.

In accordance with this phase of the invention, the aforementioned type of operation for causing further subdivision of the dispersed particles will be brought about much more easily and quickly by subjecting the dispersion to the cooling action and then feeding the thickening or flocculating agent, such as potassium dichromate or aluminum sulphate or acid or acid salts, to the beating apparatus 30 through the pipe 35, as a result of which the thickening of the cooled dispersion and the beating action of the thickened material is found to bring about an easier subdivision of the dispersed particles into particles of much finer size.

In place of asphalts such as described, I may also employ tars and pitches of vegetable, animal or mineral origin, resins or resinous materials softened, if desired, with tempering oils so as to bring them to the proper consistency for the purpose intended, and such substances are regarded as comprehended by the term "bitumen" as employed in the claims hereof.

I claim as my invention:

1. The process which comprises effecting dispersion of bitumen in water in a dispersing zone with an inorganic emulsifying agent, with the aid of an emulsifying agent of the group which produce a viscous plastic mixture with water under conditions controlled to produce dispersions of paste-like consistency, removing said dispersion of paste-like consistency from said dispersing zone, substantially lowering the temperature of the dispersion after removal, charging the cooled dispersion to a beating zone separate from the emulsifying zone and there subjecting the cooled dispersion to a beating or whipping action and continuing the beating or whipping action until the desired degree of fluidity of the emulsion is obtained.

2. A process of producing aqueous dispersions of bitumen with the aid of an inorganic emulsifying agent of the group which produces a viscous plastic mixture with water, which comprises introducing bitumen in heat liquefied condition and dispersive media of the type noted into aqueous suspension in a zone wherein the mixture is subjected to agitation whereby to effect dispersion of the bitumen in the aqueous medium under conditions controlled to produce a dispersion of paste-like consistency, cooling the dispersed material leaving said zone whereby to substantially lower the temperature of the dispersion and subjecting the cooled dispersed material to further agitation at a speed differing from that of the first named agitation and continuing the agitating action until the desired degree of fluidity of the emulsion has been obtained.

3. A process of producing aqueous dispersions of bitumen with the aid of an inorganic emulsifying agent of the group which produces a viscous plastic mixture with water, which comprises introducing bitumen in heat liquefied condition and dispersive media of the type noted into aqueous suspension in a zone wherein the mixture is subjected to agitation whereby to effect dispersion of the bitumen in the aqueous medium under conditions controlled to produce a dispersion of paste-like consistency, cooling the dispersed material leaving said zone whereby to substantially lower the temperature of the dispersion and subjecting the cooled dispersed material to further agitation in a zone separate and removed from the first named zone and continuing the agitating action until the desired degree of fluidity of the emulsion has been obtained.

4. In a process for the manufacture of aqueous dispersions of bitumen with the aid of an inorganic emulsifying agent of the group which produces a viscous plastic mixture with water, wherein the bitumen is dispersed with the aid of an aqueous suspension of said dispersive media in one zone under conditions controlled to produce a dispersion of paste-like consistency, and wherein the dispersed material of paste-like consistency is subjected to a beating action in a zone separate from the dispersing zone and continuing the beating action until the desired degree of fluidity of the emulsion has been obtained, the improvement which comprises facilitating the beating action and improving the final characteristics of the product by subjecting the dispersed material to a cooling action whereby to substantially lower the temperature of the dispersion during its passage from the dispersing zone to the beating zone.

5. A process of producing aqueous dispersions of bitumen with the aid of an inorganic emulsifying agent of the group which produces a viscous plastic mixture with water, which comprises introducing bitumen in heat liquefied condition and dispersive media of the type noted in aqueous suspension into a zone wherein the mixture is subjected to agitation whereby to effect dispersion of the bitumen in the aqueous medium under conditions controlled to produce a dispersion of paste-like consistency, removing the dispersion from said zone, cooling the dispersion whereby to lower the temperature thereof at least 10° F. and subjecting the cooled dispersion to further agitation in a zone separate and removed from the first named zone and continuing the agitating action until the desired degree of fluidity of the emulsion has been obtained.

6. In the art of emulsifying bituminous substances which comprises the steps of introducing bitumen and an inorganic paste-forming colloid to an emulsification zone, leading the emulsion thus formed to a cooling zone where substantial reduction in temperature takes place, and in finally leading the cooled emulsion to a whipping or beating zone and there subjecting it to beating or whipping until the required degree of fluidity of the cooled emulsion is obtained and in compounding a flocculating substance with the emulsion while undergoing the beating and whipping action.

LESTER KIRSCHBRAUN.